United States Patent
Cowham

(10) Patent No.: US 8,892,492 B2
(45) Date of Patent: Nov. 18, 2014

(54) DECLARATIVE NETWORK ACCESS CONTROL

(75) Inventor: Adrian Cowham, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1600 days.

(21) Appl. No.: 12/336,667

(22) Filed: Dec. 17, 2008

(65) Prior Publication Data
US 2010/0153327 A1   Jun. 17, 2010

(51) Int. Cl.
G06N 5/00   (2006.01)
G06F 1/00   (2006.01)
H04L 29/06  (2006.01)
G06F 21/62  (2013.01)

(52) U.S. Cl.
CPC .......... *H04L 63/102* (2013.01); *G06F 21/6218* (2013.01); *H04L 63/02* (2013.01)
USPC ................................ 706/47; 705/51; 382/128

(58) Field of Classification Search
USPC .......................................................... 706/47
See application file for complete search history.

(56) References Cited

U.S. PATENT DOCUMENTS

2004/0250112 A1   12/2004  Valente et al.
2004/0260568 A1*  12/2004  Johnson et al. .................... 705/1
2006/0129493 A1*  6/2006   Stefik et al. ....................... 705/51
2007/0043803 A1*  2/2007   Whitehouse et al. ........... 709/201
2011/0019882 A1*  1/2011   Iwase et al. ....................... 382/128

OTHER PUBLICATIONS

SIGCOMM (2001), Declarative Network Verification, Wang, Basu, Loo and Sokolsky.*
Tufan Ekin, "Graphical User Interface Took Kit for Path-Based Network Policy Language," Thesis, Naval Postgraduate School, Monterey, California, Mar. 2002, all pages.
Emin Gun Sirer and Ke Wang, "An access control language for web services," Symposium on Access Control Models and Technologies, Proceedings of the seventh ACM Symposium on Access Control Models and Technologies, Monterey, California, pp. 23-30, 2002.
Michael T. Ullman, "The Declarative/Procedural Model of Lexicon and Grammar," Journal of Psycholinguistic Research, vol. 30, No. 1, pp. 37-69, 2001.
Gary N. Stone et al., "Network Policy Languages: A Survey and a New Approach," IEEE Network, pp. 10-21, Jan./Feb. 2001.

* cited by examiner

*Primary Examiner* — Jeffrey A Gaffin
*Assistant Examiner* — Kalpana Bharadwaj

(57) ABSTRACT

A system and method for declarative network access control are provided. The system includes an interpreter, a rules engine, a storage device, and a processor. The interpreter transforms sentences in a declarative network access control language to rules. The rules engine evaluates the rules to produce actions for providing access control to a network at a point of access. The storage device stores instructions for the interpreter, the rules and the rules engine and the processor executes those instructions.

15 Claims, 2 Drawing Sheets

DECLARATIVE NETWORK ACCESS CONTROL

FIELD OF THE INVENTION

The current invention is related to network access control and declarative models, and in particular to a network access control language.

BACKGROUND

Developing conventional network access control software is a time consuming activity. Developers need to understand all of the types of rules that customers want to use to control access. These rules usually come in the form of, for example, "if user X logs in from location Y at time Z, then user X gets ABC network access policy." Conventional network access control software is procedural code and when the code does not cover a particular use case (e.g., a user is already logged in to one part of the network and is attempting to log into another part of the network), then developers must modify, test, and release code implementing a new rule to cover the use case.

BRIEF DESCRIPTION OF THE DRAWINGS

Embodiments according to the invention are illustrated by the following drawings.

DETAILED DESCRIPTION OF THE EMBODIMENTS

Figure 1:
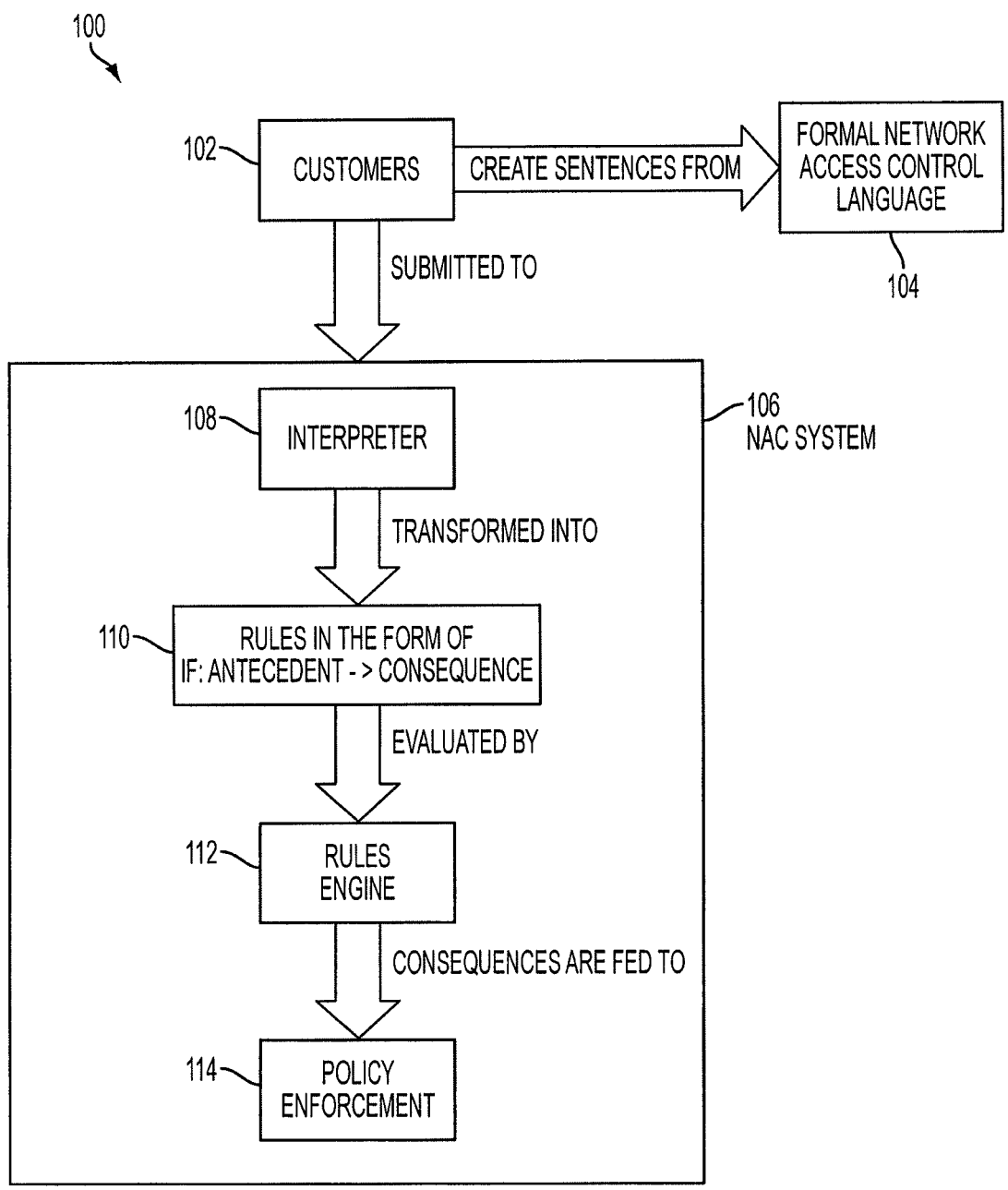
FIG. 1 is a block diagram showing an exemplary system for using a network access control language according to an embodiment of the invention.

FIG. 1 shows an exemplary system 100 for using a network access control language according to an embodiment of the invention.

Network access control may be used to enforce a set of security policies on any device seeking access to a network. Access may be controlled by only allowing compliant and/or trusted endpoint devices, such as, for example, personal computers (PCs), servers, laptops, cell phones, and personal digital assistants (PDAs) onto the network, thereby limiting the potential damage from security threats and risks, such as, for example, unauthorized access, viruses and worms. Network access control may be implemented as a rules-based method for preventing unauthorized access, providing security policy compliance, protecting infrastructure, securing managed and unmanaged assets, supporting internal environments and guest access, tailoring policies to specific risk levels, and/or providing other functionality. Network access control may be deployed in various infrastructures, including local area network (LAN), wide area network (WAN), wireless, remote access (e.g., virtual private network (VPN)), and other networks and systems and combinations thereof.

Exemplary embodiments solve the problem of developing, maintaining and extending conventional network access control software in a time-efficient fashion by using a declarative rather than a procedural programming approach. Conventional network access control software is usually implemented using a procedural model. The disadvantage of the conventional network access control software is that when a new type of rule is introduced in the form of "If user X logs in from location Y at a time Z then user X gets ABC network access policy," the conventional code that performs the rule evaluation has to be modified so that it knows how to evaluate the new type of rule. Furthermore, maintaining the conventional code is not an easy task. Once a conventional procedural rule-evaluation system needs to evaluate more than one type of rule, the code becomes convoluted, prone to error, and difficult to maintain.

Exemplary embodiments use a declarative model rather than a procedural one for defining and evaluating rules. In this way, developers may simply tell the network access control software what to do without specifying how to do it. For example, rules may literally be in the form of "If user X logs in from location Y at time Z then user X gets ABC network access policy" or any other form. Using a declarative model for defining and evaluating rules implies that a rules engine will be used for evaluation in exemplary embodiments. Rules engines are written in a generic way; that is, rules engines are capable of evaluating any type of rule.

Exemplary embodiments have many advantages, including having a rules engine that only needs to be written once to accommodate any type of rule. Furthermore, existing rules engines may be leveraged for exemplary embodiments of network access control software, further reducing the overhead of developing, maintaining, and extending the software. When a new type of rule is introduced, the rule evaluation code does not change in exemplary embodiments. For example, if, in the initial release of conventional network access control software, all types of rules are known to be in the form of "If user X logs in from location Y at time Z, then user X gets ABC network access policy," adding a new type of rule in the form of "If user X is already logged in then use X gets ABC network access policy" requires no change from the rule-evaluation perspective. This is because all rule evaluation is handled by a general purpose rules engine that knows how to evaluate any rule. Developers simply need to tell the rules engine which rules to evaluate (i.e., the declarative model).

Network access control may be implemented as software stored in at least one memory device coupled to a processor, such as, for example, a rule-based application. The software application, which is executed on the processor, has the general purpose of accepting input, finding all matching rules, execute the matching rules, and carrying out the consequence of the executed rules.

The exemplary system of FIG. 1 includes a network access control language 104 that is a declarative language. A declarative language may be any relational language or functional language. A declarative programming language may describe relationships between variables in terms of functions or inference rules, and the language executor (interpreter or compiler) may apply some fixed algorithm to these relations to produce a result. A declarative language may be contrasted with an imperative language which specifies manipulation of the computer's internal state or a procedural language which specifies a sequence of steps to follow.

One example of an application implemented using a declarative language is a production system. A production system may include a collection of productions (i.e., rules), a working memory of facts and an algorithm for forward chaining that produces new facts from old. Rules may be declarative statements and may specify conditional actions or policies, such as if-then statements. The production system may include a rules engine to execute, analyze or run one or more rules based on input facts. The rules engine may conditionally execute one or more actions and/or one or more results (e.g., a new fact) may be returned. The application may be implemented, for example, as a production system may include application logic (e.g., network access control logic) and display logic. The application logic may include rules and other logic to execute in a rules engine. The application may be stored in at least one memory device coupled to at least one processor, which may, in turn, be coupled to a display device and an input/output device. In such an application, the rules engine may evaluate a rule without any code being modified. This improves development time over procedural code.

In FIG. 1, customers 102 may use the exemplary system 100 to create sentences from the network access control language 104. These sentences may be submitted to the system network access control system 106. The network access control system 106 includes an interpreter 108, rules 110 stored on a storage device (not shown), a rules engine 112, and a policy enforcement component 114. The interpreter 108 may be any software that interprets the input sentences of the network access control language 104, transforming them into rules in the form of if <antecedent> then <consequence> 110. These output rules may be evaluated by the rules engine 112, resulting in consequences that may be input to the policy enforcement component 114. The policy enforcement component 114 may carry out the actions indicated in the consequences of the evaluated rules, which consequently may enforce the policies for the network access control system.

The exemplary system 100 may broadly address the access control of an entire network or multiple networks, each network including various access-controlled resources, such as servers, desktop computers, databases and other resources. Other embodiments may control access to a single server or parts of a network or networks. The exemplary system 100 may be used at the point of access. That is, when a client first attempts to connect to the network, the rules, which are generated by the interpreter 108 from the sentences in the network access control language 104, may be evaluated and executed by the policy enforcement 114. The exemplary system 100 includes a concept of identity by uniquely identifying clients and applying custom rule-sets to each client. The declarative network access control language may be used at the core of a network, that is, the point or points at which traffic passes through.

Figure 2:
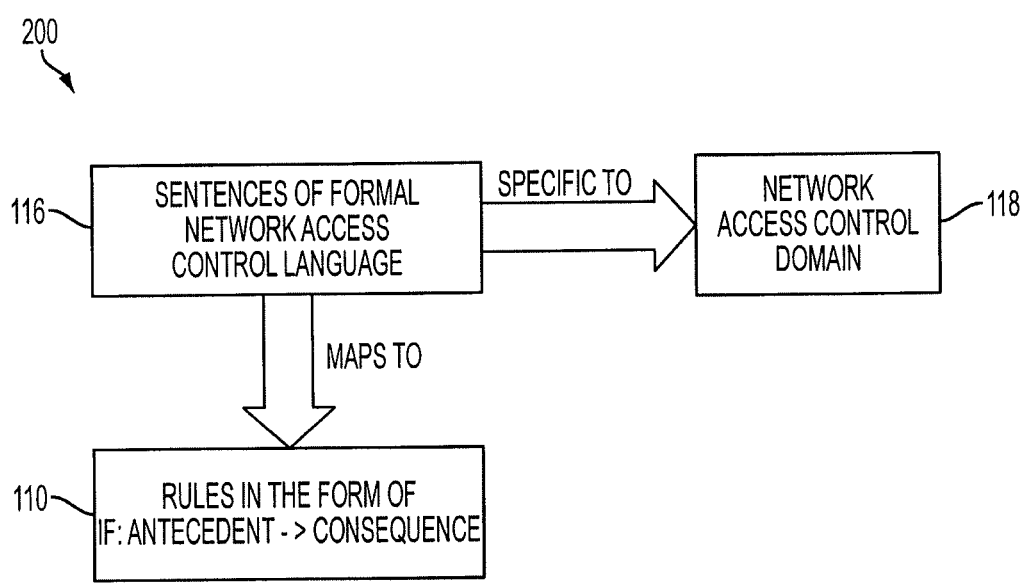
FIG. 2 is a block diagram showing an exemplary domain of the system of FIG. 1.

FIG. 2 shows an exemplary domain 200 of the system of FIG. 1. In a particular network access control domain 118, there may be a common language across one or more domains. In security, an environment or context that is defined by security policies, security models, or security architecture to include a set of system resources and a set of system entities that have the right to access those resources may be called a domain. The domain may include, for example, network infrastructure devices, authentication servers, and management applications (not shown).

Table 1 below is an exemplary grammar for a declarative access control language. In computer science, a grammar may be a precise description of the syntax of a formal language used to generate a set of strings over some alphabet (e.g., ASCII symbols). In other words, a grammar may describe which of the possible sequences of symbols (strings) in a language constitute valid words, statements or sentences in that language. A compiler, interpreter, or some other software may be written to include a semantics of such sentences (i.e., what they mean). A grammar is usually regarded as a means to generate all the valid strings of a language; it may also be used as a basis for a recognizer that determines for any given string whether it is grammatical (i.e., belongs to the language). A grammar may also be used to analyze the strings of a language (i.e., to describe their internal structure). In computer science, this process is known as parsing and may be implemented in software known as a parser.

The exemplary grammar of table 1 may be used as a basis for generating a variety of compilers, interpreters, parsers, and other tools for implementing the declarative network access control language described by the grammar in various ways. Table 1 defines an exemplary embodiment of a grammar for a declarative network access control language, where:
<xxx> represents variables that can be further expanded;
| is the logical OR operator;
&& is the logical AND operator;
[] are optional parameters;
+ at least one symbol from an alphabet;
* is zero or more symbols from the alphabet;
:= is the assignment operator;
Items without < > or [] are constants and require no substitution;
( ) are used to group items;
- is used to represent a range; and
{ } is the occurrence count.

TABLE 1

Exemplary Grammar

<sentence> := When <client-list> <authenticates> [and <condition-list>] <action-list>
<authenticates> := <successfully-authenticate> | <unsuccessfully-authenticate>
<successfully-authenticate> := received access-accept
<unsuccessfully-authenticate> := received access-reject
<client-list> := <client>+ | ALL-CLIENTS
<client> := [wireless | wired] [compliant | non-compliant | unknown] <user> | <machine> | <guest>
<wireless> := RADIUS attribute NAS-Port-Type in RADIUS access-request == Wireless Other(18) | RADIUS attribute NAS-Port-Type in RADIUS access-request == Wireless 802.11(19)
<wired> := RADIUS attribute NAS-Port-Type in RADIUS access-request == Ethernet(15)
<compliant> := RADIUS attribute HP-EI-Status in RADIUS access-accept == Pass
<non-compliant> := RADIUS attribute HP-EI-Status in RADIUS access-accept == Fail
<unknown> := RADIUS attribute HP-EI-Status in RADIUS access-accept == Unknown
<user> := <username> | <domain>/<username> | <username>@<domain>
<username> := *
<domain> := (a-z,-,_)+ | (a-z,-,_)+(.a-z,-,_)*
<machine> := host/<username> | ([0-9a-f]{2}([:-]|)){6}
<action-list> := <action>*

TABLE 1-continued

Exemplary Grammar

<action> := <reject> | <classify-as-guest> | <classify-traffic classification> | <filter-traffic <filter>> | <route-traffic-to <vlan-id>> | <quarantine> | <allow-for-duration duration> | <filter-traffic-using <filter>>
<reject> := Issue Access-Reject RADIUS message to RADIUS client
<classify-as-guest> := <route-traffic-to guest-destination>
<guest-destination> := <vlan-id>
<vlan-id> := VLAN [1-4094]
<classify-traffic <traffic-classification>> := set the RADIUS attribute HP-bandwidth-max-ingress to classification && set the RADIUS attribute HP-bandwidth-max-egress to classification. This attribute must only be set on a RADIUS access-accept.
<traffic-classification> := 0-10,000,000 Kbps
<filter-traffic <filter>> := set the RADIUS attribute HP-nas-filter-rule to <filter>. This attribute must only be set in a RADIUS access-accept.
<filter> := (allow | deny) in <protocol> from any to <ip-address> cnt
<filter-name> := +
<protocol> := 0-255
<ip-address> := (25[0-5]|2[0-4][0-9]|[01]?[0-9][0-9]?)\.(25[0-5]|2[0-4][0-9]|[01]?[0-9][0-9]?)\.(25[0-5]|2[0-4][0-9]|[01]?[0-9][0-9]?)\.(25[0-5]|2[0-4][0-9]|[01]?[0-9][0-9]?) \[1-32]
<route-traffic-to <vlan-id>> := Set the following RADIUS attributes in the RADIUS access-accept packet, Tunnel-Type=VLAN, Tunnel-Medium=802, Tunnel-Private-Group-ID=<vlan-id>
<quarantine> := <route-traffic-to quarantine-destination>
<quarantine-destination> := <vlan-id>
<allow-for-duration <duration>> := In the RADIUS access-accept message, set the RADIUS Session-Timeout = <duration>
<duration> := 1 - 999,999,999,999 milliseconds
<condition-list> := <condition>+
<condition> := <attempted-to-login-from <location>> | <attempted-to-login-during <time-period>> | attempted-to-login-using [<wlan> | <machine>]>
<attempted-to-login-from <location>> := In the RADIUS access-request message, the RADIUS attribute NAS-IP exists in <location> && the RADIUS attribute NAS-Port exists in <location>
<location> := <ip-address>+ | (<ip-address> <port-list>)+
<port-list> := [1-500]+ ,[1-500]*
<attempted-to-login-during <time-period>> := The RADIUS access-request message was received within the bounds of <time-period>
<attempted-to-login-using [<wlan> | <machine>]> := In the RADIUS access-request, the calling-station-ID RADIUS attribute == <wlan> | calling-station-ID == <machine>
<time-period> := (start time in UTC, end time in UTC)+
<wlan> := ([0-9]|[a-f]|[-])*

Table 2 below lists examples of sentences formed using the exemplary grammar of Table 1. The first example sentence in Table 2, "When John received access-accept and attempted-to-login-from 192.168.1.100 Issue Access-Reject RADIUS message to RADIUS client," illustrates how the declarative network access control language 104 may be used to uniquely identify a client (e.g., the RADIUM client) and apply a custom rule for that client. The first sentence also illustrates how a specific location, (e.g., IP address 192.168.1.100) may be used in a sentence. In another embodiment of a grammar for the declarative network access control language, a location in a sentence formed using that grammar may be a point of access to the network or the core of the network.

TABLE 2

Examples of Sentences

When John received access-accept and attempted-to-login-from 192.168.1.100
Issue Access-Reject RADIUS message to RADIUS client
When ALL-CLIENTS received access-reject and attempted-to-log-in-using GUEST-WLAN, classify-as-guest
When Sarah received access-accept route-traffic-to VLAN 1
When Tom received access-accept filter-traffic-using Marketing-department-filter
When wired non-compliant user received access-reject quarantine The example sentences in Table 2 may be created by customers 102 using the declarative access control language 104. These example sentences may be submitted to the interpreter 108 and transformed into rules. The generated rules may be evaluated by the rules engine 112 so that the resulting access control policies may be enforced by the policy enforcement component 114.

The first example sentence in Table 2, "When John received access-accept and attempted-to-login-from 192.168.1.100 Issue Access-Reject RADIUS message to RADIUS client" is formed by making substitutions for the items enclosed in "< >" in the following sentence from Table 1:

<sentence> := When <client-list> <authenticates> [and <condition-list>] <action-list>.

The first word "When" is in the sentence and no substitution is needed.

The second word "John" in the sentence indirectly substitutes John for <client-list> through a series of substitutions as follows.

First,

<username> := * and * is defined as zero or more symbols, which here is the concatenation of "J", "o", "h", and "n" so that John substitutes for <username> and <username> matches one of the alternative selections in <user> := <username> | <domain>/<username> | <username>@<domain>.
Further substituting
<user> := <username>
and <user> for <client>, because <user> is one of the alternative selections in
<client> := [wireless | wired] [compliant | non-compliant | unknown] <user> |
<machine> | <guest>
and because <client> is one of the alternative selections in
<client-list> := <client>+ | ALL-CLIENTS,
yields the series of substitutions <client-list> = <client> = <user> =<username>
= John so that John may be substituted for <client-list> in
<sentence> := When <client-list> <authenticates> [and <condition-list>] <action-list>, thus forming the first two words "When John" of the first example sentence.

The next phrase of the first example sentence, "received access-accept," comes from the selection of successfully-authenticate among the alternatives in <authenticates> := <successfully-authenticate> | <unsuccessfully-authenticate> and the substitution of <successfully-authenticate> := received access-accept, thus forming the initial portion "When John received access-accept" of the first example sentence.

The next word of the first example sentence is "and" is simply in the <sentence> := When <client-list> <authenticates> [and <condition-list>] <action-list> so that no substitution is needed.

The next phrase "attempted-to-login-from 192.168.1.100" is formed by selecting <attempted-to-login from <location>> from the alternatives in <condition> := <attempted-to-login-from <location>> | <attempted-to-login-during <time-period>> | attempted-to-login-using [<wlan> | <machine>]> and by substituting <condition> for <condition-list> because <condition-list> := <condition>+
and selecting <ip-address>+ with only one occurrence of <ip-adress> in <location> := <ip-address>+ | (<ip-address><port-list>)+,
where 192.168.1.100 is an ip-address formed by matching symbols to <ip-address> := (25[0-5]|2[0-4][0-9]|[01]?[0-9][0-9]?) \.(25[0-5]|2[0-4][0-9]|[01]?[0-9][0-9]?)\.(25[0-5]|2[0-4][0-9]|[01]?[0-9][0-9]?) \.(25[0-5]|2[0-4][0-9]|[01]?[0-9][0-9]?)\[1-32],
resulting in "When John received access-accept and attempted-to-login-from 192.168.1.100", which has all but the last phrase in the first example sentence.

The last phrase "Issue Access-Reject RADIUS message to RADIUS client" substitutes reject for <action-list> because a single action is selected from
<action-list> := <action> *
and <reject> is selected from the alternatives in
<action> := <reject> | <classify-as-guest> | <classify-traffic classification> | <filter-traffic <filter>> | <route-traffic-to <vlan-id>> | <quarantine> | <allow-for-duration duration> | <filter-traffic-using <filter>>.
Substituting
<reject> := Issue Access-Reject RADIUS message to RADIUS client,
results in the whole first example sentence "When John received access-accept and attempted-to-login-from 192.168.1.100 Issue Access-Reject RADIUS message to RADIUS client."

The second example sentence in Table 2, "When ALL-CLIENTS received access-reject and attempted-to-log-in-using GUEST-WLAN, classify-as-guest" is formed in a similar manner using substitution and matching with the following expressions in the grammar of Table 1.

<sentence> := When <client-list> <authenticates> [and <condition-list>] <action-list>
<client-list> := <client>+ | ALL-CLIENTS
<client> := [wireless | wired] [compliant | non-compliant | unknown] <user> | <machine> | <guest>
<authenticates> := <successfully-authenticate> | <unsuccessfully-authenticate>
<unsuccessfully-authenticate> := received access-reject
<condition-list> := <condition>+
<condition> := <attempted-to-login-from <location>> | <attempted-to-login-during <time-period>> | attempted-to-login-using [<wlan> | <machine>]>
<attempted-to-login-from <location>> := In the RADIUS access-request message, the RADIUS attribute NAS-IP exists in <location> && the RADIUS attribute NAS-Port exists in <location>
<attempted-to-login-using [<wlan> | <machine>]> := In the RADIUS access-request, the calling-station-ID RADIUS attribute == <wlan> | calling-station-ID == <machine>
<wlan> := ([0-9]|[a-f]|[-])*
<machine> := host/<username> | ([0-9a-f]{2}([:-]|)){6}
<action-list> := <action>*
<action> := <reject> | <classify-as-guest> | <classify-traffic classification> | <filter-traffic <filter>> | <route-traffic-to <vlan-id>> | <quarantine> | <allow-for-duration duration> | <filter-traffic-using <filter>>

The third example sentence in Table 2, "When Sarah received access-accept route-traffic-to VLAN 1" is formed in a similar manner using substitution and matching for the following expressions in the grammar of Table 1.

```
<sentence> := When <client-list> <authenticates> [and <condition-list>] <action-list>
<client-list> := <client>+ | ALL-CLIENTS
<client> := [wireless | wired] [compliant | non-compliant | unknown] <user> | <machine> | <guest>
<username> := *
<authenticates> := <successfully-authenticate> | <unsuccessfully-authenticate>
<successfully-authenticate> := received access-accept
<action-list> := <action>*
<action> := <reject> | <classify-as-guest> | <classify-traffic classification> | <filter-traffic <filter>> | <route-traffic-to <vlan-id>> | <quarantine> | <allow-for-duration duration> | <filter-traffic-using <filter>>
<vlan-id> := VLAN [1-4094]
```

The fourth example sentence in Table 2, "When Tom received access-accept filter-traffic-using Marketing-department-filter" is formed in a similar manner using substitution and matching for the following expressions in the grammar of Table 1.

```
<sentence> := When <client-list> <authenticates> [and <condition-list>] <action-list>
<client-list> := <client>+ | ALL-CLIENTS
<client> := [wireless | wired] [compliant | non-compliant | unknown] <user> | <machine> | <guest>
<username> := *
<authenticates> := <successfully-authenticate> | <unsuccessfully-authenticate>
<successfully-authenticate> := received access-accept
<action-list> := <action>*
<action> := <reject> | <classify-as-guest> | <classify-traffic classification> | <filter-traffic <filter>> | <route-traffic-to <vlan-id>> | <quarantine> | <allow-for-duration duration> | <filter-traffic-using <filter-name>>
<filter-name> := +
```

The fifth and last example sentence, "When wired non-compliant user received access-reject quarantine" is formed in a similar manner using substitution and matching for the following expressions in the grammar of Table 1.

```
<sentence> := When <client-list> <authenticates> [and <condition-list>] <action-list>
<client-list> := <client>+ | ALL-CLIENTS
<client> := [wireless | wired] [compliant | non-compliant | unknown] <user> | <machine> | <guest>
<authenticates> := <successfully-authenticate> | <unsuccessfully-authenticate>
<successfully-authenticate> := received access-accept
<unsuccessfully-authenticate> := received access-reject
<action-list> := <action>*
<action> := <reject> | <classify-as-guest> | <classify-traffic classification> | <filter-traffic <filter>> | <route-traffic-to <vlan-id>> | <quarantine> | <allow-for-duration duration> | <filter-traffic-using <filter>>
```

The example sentences in Table 2 may be transformed by the interpreter 108 to rules in the form of, for example, if <antecedent>→<consequence> 110, which may then be evaluated by the rules engine 112 and implemented by the policy enforcement component 114, as illustrated in FIG. 1. The first sentence, "When John received access-accept and attempted-to-login-from 192.168.1.100 Issue Access-Reject RADIUS message to RADIUS client," may be transformed into a rule that may be evaluated by the rules engine 112, resulting in consequences or actions that may be carried out by the policy enforcement component 114 to deny access to John when he attempts to login from a particular location and to display a message indicating that access was denied. The second sentence, "When ALL-CLIENTS received access-reject and attempted-to-log-in-using GUEST-WLAN, classify-as-guest" may deny access to guests who are not authenticated when they attempt to login to a particular machine. The third sentence, "When Sarah received access-accept route-traffic-to VLAN 1" may provide access to Sarah and route traffic to a particular network. The fourth sentence, "When Tom received access-accept filter-traffic-using Marketing-department-filter" may permit access to Tom with a specific filter related to the marketing department, which may be the department in which Tom works. The fifth sentence, "When wired non-compliant user received access-reject quarantine" may quarantine a non-compliant user who was not authenticated. These example sentences illustrate merely a few possible rules and policies that may be used in a network access control system, but many other varied sentences may also be generated by various other grammars for a declarative network access control language according to various embodiments and processed by various other interpreters, rules engines, and policy enforcement and/or other components in various network access control systems.

What is claimed is:

1. A method for declarative network access control, comprising:
- receiving at least one sentence from at least one customer in a declarative access control language, wherein the at least one sentence comprises at least one client, an authentication result, at least one condition, and an action;
- interpreting the at least one sentence to generate at least one rule;
- evaluating the at least one rule to generate at least one consequence; and
- providing access control to at least one network based on the at least one consequence.

2. The method of claim 1, wherein the network access control is provided at a point of access.

3. The method of claim 1, wherein the sentence further comprises a location.

4. A system for declarative network access control, comprising:
- an interpreter to transform a plurality of sentences in a declarative network access control language to a plurality of rules, wherein one of the plurality of sentences comprises at least one client, an authentication result, at least one condition, and a consequence;
- a rules engine to evaluate the rules to produce a plurality of actions for providing access control to at least one network at a point of access;
- at least one storage device to store instructions for the interpreter, the rules and the rules engine; and
- at least one processor coupled to the storage device to execute the instructions for the interpreter and the rules engine.

5. The system of claim 4, further comprising:
- a policy enforcement component to carry out the actions;
- wherein the storage device stores instructions for the policy enforcement component and the processor executes the instructions for the policy enforcement component.

6. The system of claim 4, further comprising:
- at least one display device to display information related to the actions on a display.

7. The system of claim 4, wherein the rules engine evaluates the rules at a point of access to the network.

8. The system of claim 4, wherein at least one of the rules comprises the at least one client and the authentication result.

9. The system of claim 4, wherein at least one of the rules comprises the at least one condition.

10. The system of claim 4, wherein at least one of the rules further comprises a location.

11. A method for declarative network access control, comprising:
- receiving a sentence from a network administrator in a declarative programming language in which relationships between variables are defined in terms of functions or interference rules, wherein the sentence comprises at least one client, an authentication result, at least one condition, and an action;
- interpreting the sentence to generate at least one rule regarding access to a network; and
- providing or denying access to said network based on the generated at least one rule.

12. The method of claim 11, wherein said generated at least one rule governs access to said network for the client that is specified in both the sentence and the at least one rule generated from interpreting the sentence.

13. The method of claim 11, wherein the generated at least one rule further comprises a location.

14. The method of claim 11, wherein the generated at least one rule further comprises a time.

15. The method of claim 11, wherein the generated at least one rule further specifies a network access policy governing network access granted under the generated at least one rule.

* * * * *